United States Patent
Prabhakar et al.

(10) Patent No.: US 6,351,466 B1
(45) Date of Patent: Feb. 26, 2002

(54) SWITCHING SYSTEMS AND METHODS OF OPERATION OF SWITCHING SYSTEMS

(75) Inventors: Balaji Prabhakar, Cambridge, MA (US); Nick McKeown, Stanford, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/071,085

(22) Filed: May 1, 1998

(51) Int. Cl.$^7$ ............................................. H04L 12/28
(52) U.S. Cl. ................... 370/413; 370/414; 370/422; 370/429
(58) Field of Search ............................ 370/422, 413, 370/414, 412, 429

(56) References Cited

U.S. PATENT DOCUMENTS

| | | | | |
|---|---|---|---|---|
| 5,157,654 A | * | 10/1992 | Cisneros ...................... | 370/414 |
| 5,168,492 A | * | 12/1992 | Beshai et al. ................ | 370/353 |
| 5,550,815 A | * | 8/1996 | Cloonan et al. ............. | 370/414 |
| 5,742,606 A | * | 4/1998 | Iliadis et al. ................. | 370/413 |
| 5,790,522 A | * | 8/1998 | Fichou et al. ................ | 370/236 |
| 5,905,725 A | * | 5/1999 | Sindhu et al. ............... | 370/389 |

OTHER PUBLICATIONS

Charny, et al., "Algorithms for Providing Bandwidth and Delay Guarantees in Input–Buffered Crossbars with Speedup," 1998 IEEE 0–7803–4482–0, pp. 235–244.

Anderson, "High–Speed Switch Scheduling for Local–Area Networks," ACM Transactions on Computer Systems, vol. 11, No. 4, Nov. 1993, pp. 319–352.

Krishna et al., "On the Speedup Required for Work–Conserving Crossbar Switches," IEEE Journal on Selected Areas in Communications, vol. 17, No. 6, Jun. 1999, pp. 1057–1066.

McKeown, "The iSlip Scheduling Algorithm for Input–Queued Switches," IEEE/ACM Transactions on Networking, vol. 7, No. 2, Apr. 1999, pp. 188–201.

Charny, "Providing QoS Guarantees in Input Buffered Crossbar Switches with Speedup," PhD Thesis, Massachusetts Inst. of Tech. 1998.

* cited by examiner

*Primary Examiner*—Hassan Kizou
*Assistant Examiner*—Thien D Tran (57) ABSTRACT

Architectures based on a non-blocking fabric, such as a crosspoint switch, are attractive for use in high-speed LAN switches, ATM switches and IP routers. These fabrics, coupled with memory bandwidth limitations, dictate that queues be placed at the input of the switch. But it is well known that input-queueing can lead to low throughput, and does not allow the control of latency through the switch. This is in contrast to output-queueing, which maximizes throughput, and permits the accurate control of packet latency through scheduling. A switch is disclosed with virtual output queueing at the input and queueing at the output with a speedup of just four, and the use of a "most urgent packet first" method of operation, the switch can behave identically to an output-queued switch, regardless of the nature of the arriving traffic. The switch therefore performs as if it were output-queued, yet uses memory that runs more slowly.

14 Claims, 3 Drawing Sheets

SWITCHING SYSTEMS AND METHODS OF OPERATION OF SWITCHING SYSTEMS

BACKGROUND OF THE INVENTION

1. Field of the Invention

This invention relates to switching systems and to methods of operation of switching systems. For example, the switching systems with which the invention is concerned might find application as crosspoint switches in local area network (LAN) switches, asynchronous transfer mode (ATM) switches and Internet protocol (IP) routers.

More particularly, the switching system to which the invention relates is intended for connection between a plurality of input lines and a plurality of output lines, and comprises a transfer stage operable to transfer packets of data from any of the input lines to those of the output lines for which those packets are destined. It is necessary with such switches to provide some form of queueing for the packets of data.

2. Description of the Prior Art

Many commercial switches and routers today employ output-queueing. When a packet arrives on an input line of an output queue switch, it is immediately transferred by the transfer stage to a queue at an output stage that is dedicated to its output line, where it will wait until departing from the switch. This approach is known to maximize the throughput of the switch; so long as no input or output is oversubscribed, the switch is able to support the traffic, and the occupancies of queues remain bounded.

The use of a separate queue for each output means that flows of packets for different outputs are kept separate, and cannot interfere with each other. By carefully scheduling the time a packet is placed onto the outgoing line, a switch or router can control the packet's latency, and hence provide quality-of-service guarantees. But output queueing is impractical for switches with high line rates, or with a large number of ports. The fabric and memory (i.e. transfer stage) of an N×N switch must run N times as fast as the line rate. Unfortunately, at high line rates, memories with sufficient bandwidth are simply not available.

On the other hand, the fabric and the memory of an input-queued switch need only run as fast as the line rate. This makes input queueing very appealing for switches with fast line rates, or with a large number of ports. For a given speed of memory, it is possible to build a faster switch; or for a given speed switch, it is possible to use slower, lower-cost memory device.

But, the main problem of input-queued switching is head-of-line blocking, whose effect on throughput can be severe. It has been shown that if each input maintains a single first-in-first-out queue, then head-of-line blocking can limit the throughput to just 58.6%.

One method that has been proposed to reduce head-of-line blocking is to increase the "speedup" of a switch. A switch with a speedup of S can remove up to S packets from each input and deliver up to packets to each output within a time slot, where a time slot is the time between packet arrivals at the inputs. Hence, an output-queued switch has a speedup of S=N while an input-queued switch has a speedup of S=1. For values of S between 1 and N, buffers are needed at the inputs before switching as well as buffers at the outputs after switching. Hence such a switch will be referred to a combined-input-and-output-queued switch.

Both analytical and simulation studies of a combined-input-and-output-queued switch which maintains a single first-in-first-out queue at each input have been conducted for various values of the speedup. A common conclusion of these studies is that, with a speedup of S=4 or 5, one can achieve about 99% throughput when arrivals are independent and identically distributed at each input and the distribution of packet destinations is uniform across the outputs.

But it has been shown that a throughput of 100% can be achieved with a speedup of just one, if the inputs are arranged differently. That is, head-of-line blocking can be eliminated entirely using a scheme known as "virtual output queueing" in which each input maintains a separate queue for each output. It has been shown that for independent arrivals, the throughput of an input-queued switch can be increased to 100%. The conclusion may be drawn that speedup is not necessary to eliminate the effect of head-of-line blocking.

In practice, it is not only the throughput of a switch which is of interest, but also the latency of individual packets. This is particularly important if a switch or router is to offer quality-of-service guarantees. Packets in an input-queued switch not only contend for an output, they also contend for entry into the switch fabric with packets that are destined for other outputs. This phenomenon is called "input contention" which places a packet at the mercy of other packets destined for other outputs. This is in stark contrast with an output-queued switch, where a packet is unaffected by packets destined for other outputs. The conclusion may be drawn that, to control delay, a mechanism is needed which eliminates input contention.

SUMMARY OF THE INVENTION

Previous studies of combined-input-and-output-queued switches make no guarantees about the delay of an individual packet, but only about average delay and throughput. The present invention is concerned with the delay of individual packets. Rather than find values of speedup that work well on average, or with simplistic traffic models, the invention is concerned with providing a combined-input-and-output-queued switch which behaves similarly, and preferably identically to an output-queued switch, preferably for all types of traffic, and preferably with the minimum speedup.

The present invention achieves this, in one aspect, by providing a method of operation of the switching system which comprises the steps of: for each output stage, noting the temporal order in which the packets destined for that output stage are received by the input stages; and controlling the transfer stage so that, for each output stage, the packets destined for that output stage are transferred from the input stages to that output stage in the noted order.

Preferably, the system operates according to time slots such that: no more than one packet is received by each input stage during each time slot; and no more than one packet is supplied by each output stage during each time slot; and each time slot is divided into a plurality of phases, for example between two and four such phases, such that: no more than one packet is transferred from each input stage by the transfer stage during each phase; and no more than one packet is transferred to each output stage by the transfer stage during each phase.

As will be shown later in this specification, if each such time slot is divided into four such phases (i.e. a speedup of four), the switching system can be made to behave identically to an output-queued switch.

In one example to achieve this, the controlling step includes the step, during each phase and for each output stage, of: selecting that one of the input stages, if any, having that one of the packets which are destined for that output stage which is earliest in the noted temporal order; and transferring that one packet from the selected input stage to that output stage unless there is input contention due to the selected input stage also having been selected for another of the output stages. If there is such input contention, that one of the output stages whose destined packet is earliest in the noted temporal order may be selected, unless there is none which is earliest. If none of the packets is earliest, selection between the output stages may be made in accordance with the predetermined ranking. In the case of input contention, the controlling step is preferably repeated for the or each output stage which is not selected in respect of the next earliest packet in the noted temporal order.

As in the known combined-input-and-output-queued switch, each input stage preferably comprises a plurality of input buffers, one for each output stage, the method further including the step of placing each received packet in that one of the input buffers for the input line on which that packet is received and for the output stage for which that packet is destined. Also, each output stage preferably comprises a respective output buffer for the packets, but, unlike the known output-queued switch or known combined-input-and-output-queued switch, the packets are preferably output from the respective output buffer to the respective output line in dependence upon the noted temporal order of the packets in the respective output buffer.

In accordance with another aspect of the invention, there is provided a switching system comprising: a plurality of output stages each operable to supply packets of data to a respective output line; a plurality of input stages each operable to receive packets of data on a respective input line, each received packet being destined for at least a respective one of the output stages; a transfer stage operable to transfer packets of data from any of the input stages to those of the output stages for which those packets are destined; means for detecting, for each output stage, the temporal order in which the packets destined for that output stage are received by the input stages; and means for controlling the transfer stage so that, for each output stage, the packets destined for that output stage are transferred from the input stages to that output stage in the detected temporal order.

Each output stage preferably comprises a respective output buffer for the packets, with the packets being supplied from that buffer to the respective output line in dependence upon the detected temporal order of the packets in the respective output buffer. Also, each input stage preferably comprises an input buffer for each output stage, such as a first-in-first-out buffer.

Other objects, features and advantages of the invention will be apparent from the following detailed description of the preferred embodiments of the invention, given purely by way of example.

DETAILED DESCRIPTION OF THE PREFERRED EMBODIMENTS

Crosspoint switches or crossbar switches, such as are shown in FIGS. 1 to 4, typically consist of three main components: inputs 14 (which may include buffers 28,32) for cells 10 arriving at the switch on input lines 12; outputs 20 (which may include buffers 18) for cells 10 leaving the switch on output lines 22; and a crosspoint fabric 24 which transfers cells from the inputs 14 to the outputs 20. A switch scheduler makes a "matching" between inputs 14 and outputs 20 and configures the fabric 24 to allow the transfer of cells to take place, subject to the constraint that, in a particular time slot, no input 14 may be matched to more than one output 20, and, conversely, no output 20 may be matched to more than one input 14.

Figure 1:
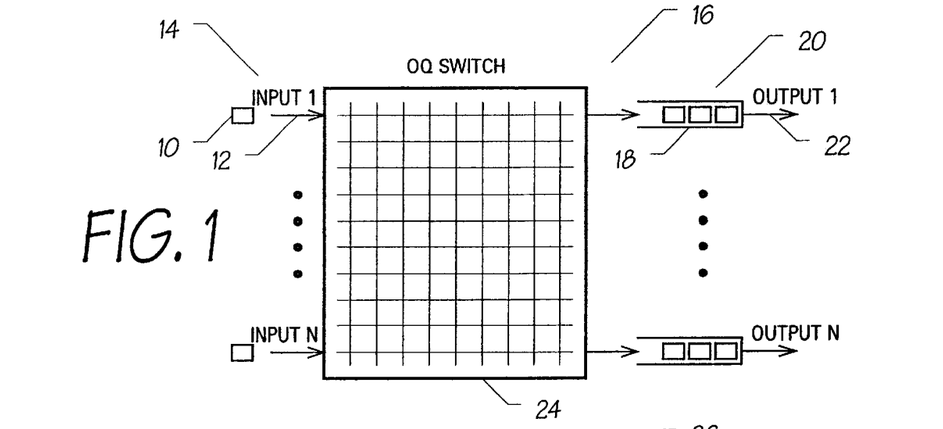
FIG. 1 is a schematic diagram illustrating an output-queued switch.

As mentioned above, many commercial switches and routers today employ output-queueing. (References to output-queueing in this specification, include designs that employ centralized shared memory.) As shown in FIG. 1, when a packet 10 arrives on an input line 12 at an input 14 of an output-queued switch 16, it is immediately placed in a queue 18 at an output 20 that is dedicated to its output line 22, where it will wait until departing from the switch 16. This approach is known to maximize the throughput of the switch 16; so long as no input 14 or output 20 is oversubscribed, the switch 16 is able to support the traffic and the occupancies of queues remain bounded.

The use of a separate queue 18 for each output 20 means that flows of packets 10 for different outputs 20 are kept separate, and cannot interfere with each other. By carefully scheduling the time a packet 20 is placed onto the outgoing line 22, a switch or router 16 can control the packet's latency, and hence provide quality-of-service guarantees. But output queueing is impractical for switches with high line rates, or with a large number of ports 14,20. The fabric and memory 24 of an N×N switch 16 must run N times as fast as the line rate. Unfortunately, at high line rates, memories with sufficient bandwidth are simply not available. For example, consider a 32×32 output-queued switch 16 operating at a line rate of 10 Gbit/s. If a 512-bit memory datapath is used, memory devices 24 are required that can perform both a write and a read operation every 1.6 ns.

Figure 2:
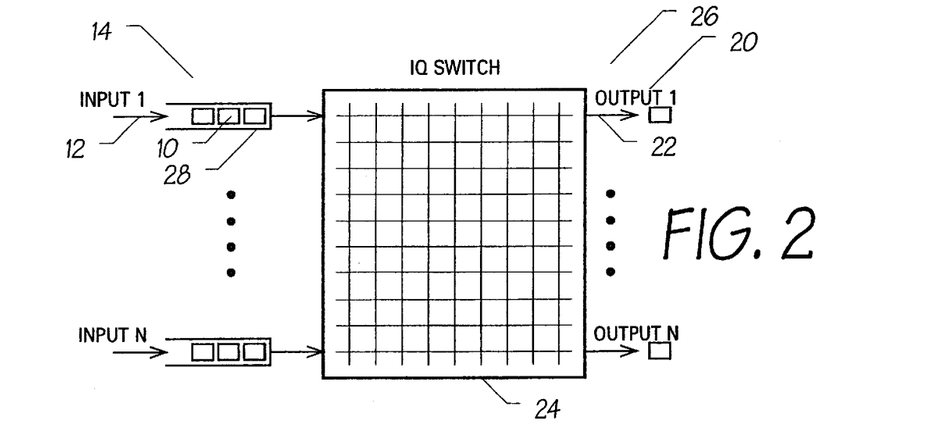
FIG. 2 is a schematic diagram illustrating an input-queued switch.

On the other hand, the fabric and the memory 24 of an input-queued switch 26, as shown in FIG. 2, need only run as fast as the line rate. This makes input queueing very appealing for switches with fast line rates, or with a large number of ports 14,20. For a given speed of memory 24, it is possible to build a faster switch 26; or for a given speed switch 26, it is possible to use slower, lower-cost memory devices 24. For example, consider the 32×32, switch 26 operating at a line rate of 10 Gbit/s again. If the switch 26 uses input-queueing instead of output-queueing, memory devices 24 can be used that perform a write and a read operation every 50 ns. This is readily achievable with commercially available memories.

But, the main problem of input-queued switching is lead-of-line blocking, whose effect on throughput can be severe. It is well-known that if each input 14 maintains a single first-in-first-out queue 28, then head-of-line blocking can limit the throughput to just 58.6% (see M. Karol, M. Hluchyj, and S. Morgan: "Input-Versus Output-Queueing on a Space Division Switch", IEEE Trans. Comm, 35(12) pp. 1347–1356).

One method that has been proposed to reduce head-of-line blocking is to increase the "speedup" of a switch. A switch with a speedup of S can remove up to S packets from each input 14 and deliver up to S packets to each output 20 within a time slot, where a time slot is the time between packet arrivals at the inputs 14. Hence, an output-queued switch 16 has a speedup of S=N while an input-queued switch 26 has a speedup of S=1. For values of S between 1 and N, buffers 28 are needed at the inputs 14 before switching as well as buffers 18 at the outputs 20 after switching, as shown for the combined-input-and-output-queued switch 30 in FIG. 3.

Figure 3:
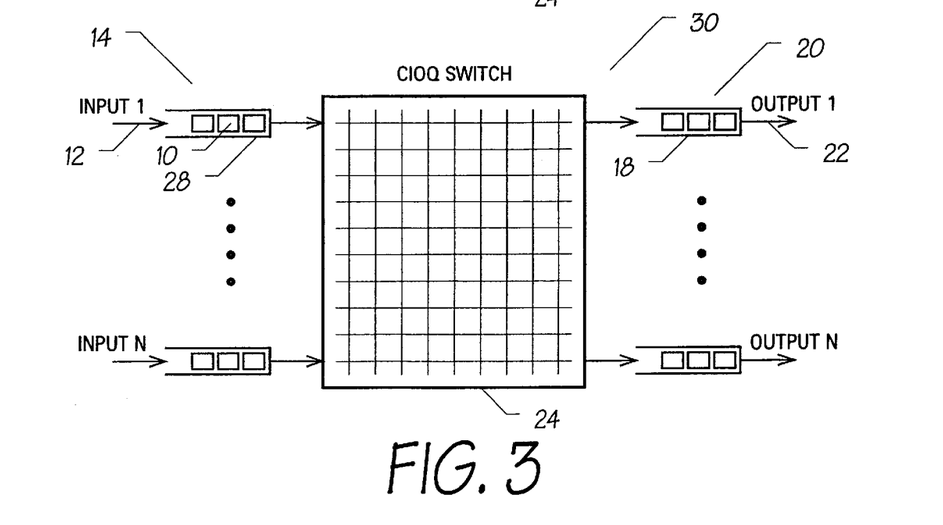
FIG. 3 is a schematic diagram illustrating a combined-input-and-output-queued switch.

Both analytical and simulation studies of a combined-input-and-output-queued switch 30 which maintains a single first-in-first-out queue 28 at each input have been conducted for various values of the speedup (see C-Y. Chang, A. J. Paulraj, T. Kailath: "A Broadband Packet Switch Architecture with Input-and Output-Queueing", Proc. Globecom '94, pp. 448–452). A common conclusion of these studies is that, with a speedup of S=4 or 5, one can achieve about 99% throughput when arrivals are independent and identically distributed at each input 14 and the distribution of packet destinations is uniform across the outputs 20.

But it has been shown that a throughput of 100% car be achieved with a speedup of just one, if the inputs 14 are arranged differently. That is, head-of-line blocking can be eliminated entirely using a scheme known as "virtual output queueing" in which each input 14 maintains a separate queue 32 for each output 20, as shown by the switch 34 in FIG. 4. It has been shown that for independent arrivals, the throughput of an input-queued switch can be increased to 100% (see N. McKeown, V. Anantharam, J. Walrand: "Achieving 100% Throughput in an Input-Queued Switch", INFOCOM '96, pp. 296–302). The conclusion may be drawn that speedup is not necessary to eliminate the effect of head-of-line blocking.

In practice, it is not only the throughput of a switch which is of interest, but also the latency of individual packets. This is particularly important if a switch or router is to offer quality-of-service guarantees. Packets 10 in an input-queued switch 26 (FIG. 2) not only contend for an output 20, they also contend for entry into the switch fabric 24 with packets that are destined for other outputs 20. This phenomenon is called "input contention". Each input 14 can deliver only one packet 10 into the fabric 24 at a time; if it has packets for several free outputs 20, it must choose just one packet 10 to deliver, holding other packets back. This places a packet at the mercy of other packets destined for other outputs. This is in stark contrast with an output-queued switch 16 (FIG. 1), where a packet 10 is unaffected by packets destined for other outputs. The conclusion may be drawn that, to control delay, a mechanism is needed which eliminates input contention.

Previous studies of combined-input-and-output-queued switches make no guarantees about the delay of an individual packet, but only about average delay and throughput. The embodiment of the invention is concerned with the delay of individual packets. Rather than find values of speedup that work well on average, or with simplistic traffic models, the embodiment of the invention is concerned with the minimum speedup such that a combined-input-and-output-queued switch behaves identically to an output-queued switch for all types of traffic. Here, "behave identically" means that, when the same inputs are applied to both the output-queued switch 16 (FIG. 1) and to the combined-input-and-output-queued switch 34 (FIG. 4), the corresponding output processes from the two switches 16,34 are completely indistinguishable. Two processes are indistinguishable if and only if their packet sequences are identical, both in terms of packet-occurrence times and packet identities, without any restrictions being placed on arrivals, and allowance is made for arrivals that can saturate the switch.

Figure 4:
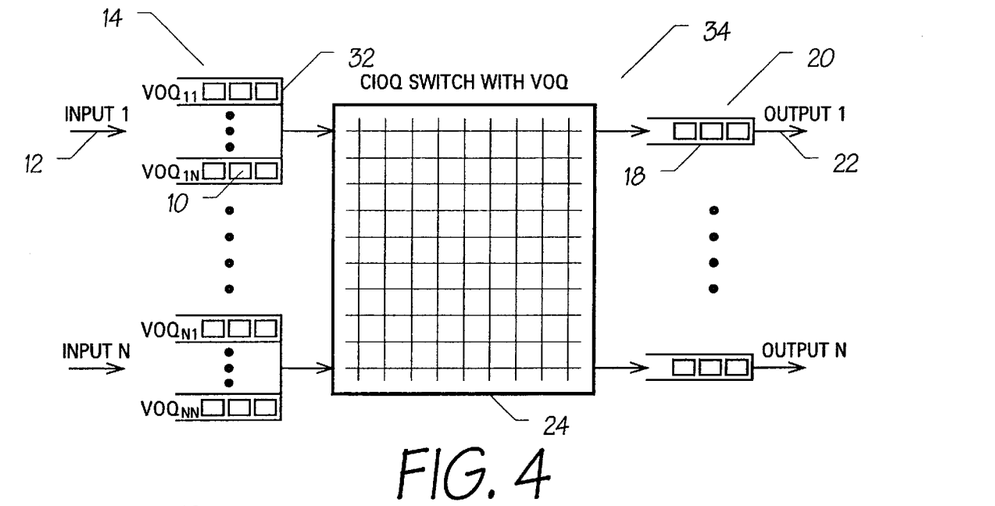
FIG. 4 is a schematic diagram illustrating a combined-input-and-output-queued switch with virtual-output-queuing.

In other words, the embodiment of the invention provides a combined-input-and-output-queued switch 34 that performs exactly the same as an output-queued switch 16, using memory devices 24 operating more slowly. As will be proved later, for a combined-input-and-output-queued switch to mimic an output-queued switch it is sufficient that the speedup equals four.

Consider a single stage, N×N, combined-input-and-output-queued switch, such as the switch 34 shown in FIG. 4. Throughout this specification, it is assumed that packets 10 begin to arrive at the switch 34 from time t=1, the switch 34 having been empty before that time. Although packets 10 arriving to the switch or router may have variable length, assume that they are treated internally as fixed length "cells". This is common practice in high performance LAN switches and routers; variable length packets are segmented into cells as they arrive, carried across the switch as cells, and reassembled back into packets again before they depart. Taking the arrival time between cells as the basic time unit, the switch is said to have a "speedup of S" for S $\in$ $\{1, 2, \ldots, N\}$ if it can remove up to S cells from each input 14 and transfer at most S cells to each output 20 in a time slot. A speedup of S requires the fabric 24 of the switch 34 to run S times as fast as the input or output line rate. As mentioned previously, the extreme values of S=1 and S=N give a purely input-queued switch (as switch 26 in FIG. 2) and a purely output-queued switch (as switch 16 in FIG. 1), respectively. For 1<S<N buffering is required both at the inputs 14 and at the outputs 20, and leads to a combined-input-and-output-queued architecture. The problem that the embodiment of the invention is required to solve is to determine the smallest value of S, say $S_{min}$, and an appropriate method of scheduling cells that:

1. allows a combined-input-and-output-queued switch 34 to exactly mimic the performance of an output-queued switch 16;
2. achieves this for any arbitrary input traffic pattern; and
3. is independent of switch size.

In an output-queued switch 16 as in FIG. 1, arriving cells are immediately forwarded to their corresponding outputs 20. This (a) ensures that outputs 20 never idle so long as there is a cell destined for them in the system, and (b) allows the departure of cells to be scheduled to meet latency constraints. Because of these features an output-queued switch 16 has the highest possible throughput and allows a tight control of cell latency which is important for supporting multiple qualities-of-service. Any solution of the speedup problem will need to possess these two desirable features; that is, a combined-input-and-output-queued switch 34 must "exactly mimic" the performance of an output-queued switch 16 in the following sense. Consider an output-queued switch 16 whose output buffers 18 are first-in-first-out. A combined-input-and-output-queued switch 34 is considered to "behave identically" to an output-queued switch 16 if, under identical inputs, the departure time of every cell from both switches 16,34 is identical.

To complete the description of the model, reference is made again to FIG. 4. All input and output buffers 32,18 are assumed to have infinite capacity. Each input 14 maintains a separate first-in-first-out queue 32 for cells destined for each output 20. Hence, there are N first-in-first-out queues 32 at each input. These queues 32 will be called "Virtual Output Queues" (VOQs), and $VOQ_{ij}$, denotes a queue 32 which buffers cells at input i destined for output j. Unlike an output-queued switch and a conventional combined-input-and-output-queued switch, in the embodiment of the invention, the output buffers 18 are controlled so that they do not necessarily behave as first-in-first-out queues. Instead, they are controlled, as described in the more detail below, so that the most urgent cell is output first from each output buffer 18.

A scheduling method is employed which selects a matching between inputs 14 and outputs 20 in such a way that each non-empty input 14 is matched with at most one output 20 and, conversely, each output 20 is matched with at most one input 14. Such a matching is a prelude to a transfer of cells from the input side to the output side. A combined-input-and-output-queued switch 34 with a speedup of S is able to make S such transfers each time slot.

A scheduling method will now be described which allows a combined-input-and-output-queued switch 34 with a small speedup to behave identically to an output-queued switch 16 for any input traffic.

The notion of a "phase" will be used; for a switch 34 with speedup S, a time slot is said to be divided into S equal phases. During each phase $\phi_i$, $1 \leq i \leq S$, the switch fabric 24 can remove at most one cell from each input 14 and can transfer at most one cell to each output 20. It is assumed that cells arriving at the inputs 14 of the switch 34 will do so at the beginning of phase $\phi_1$, while departures from the outputs 20 of the switch 34 take place at the end of phase $\phi_s$.

Figure 5:
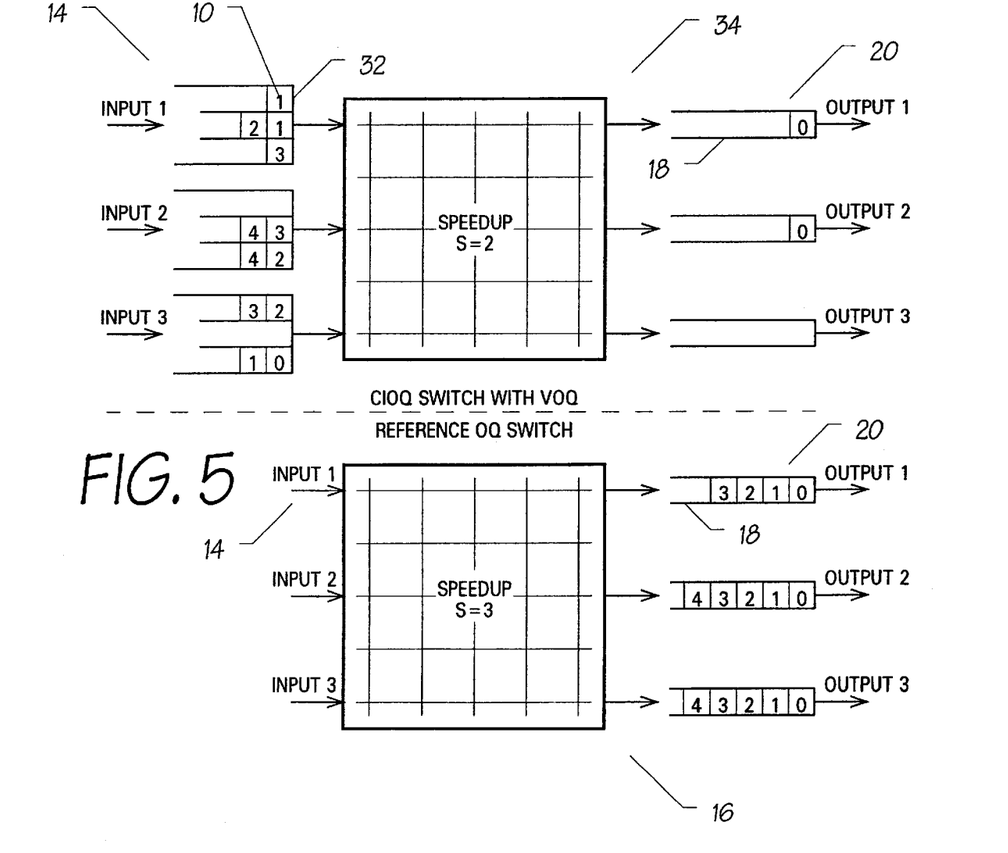
FIG. 5 is a schematic diagram illustrating a comparison between a switch of one embodiment of the invention and an output-queued switch.

An important aspect of the scheduling method is the concept of the "urgency of a cell". As mentioned above, "identical behaviour" requires a combined-input-and-output-queued switch 34 to match cell departures "identically" with an output-queued switch 16 when they are both subjected to identical inputs. Therefore, assessing identical behaviour requires a combined-input-and-output-queued switch 34 and a reference output-queued switch 16, as shown in FIG. 5.

The urgency of a cell 10 is first explained with respect to the reference output-queued switch 16. Every arriving cell 10 to this switch 16 is stamped with a number indicating the time from the present that it will depart from the switch 16. At each successive time slot, the urgency value is decremented by one. When the value reaches zero, the cell 10 will depart. Alternatively, since the buffers 18 of the output-queued switch 16 are first-in-first-out, the urgency of a cell 10 at any time equals the number of cells ahead of it in the output buffer 18 at that time.

More precisely, if a cell c arrives at input i at time T and departs from output j at time $D \geq T$, its urgency at any time R, $T \leq R \leq D$, equals D−R. Suppose there are two cells, a and b, in the buffer 18 at output j at some time, with urgencies $u_a$ and $u_b$, respectively. Cell a is said to be "more urgent" than b if $u_a < u_b$. Given that the output buffer 18 is first-in-first-out, it is clear that if b arrived at the switch 16 after a then necessarily $u_a < u_b$. If a and b arrive at the same time, then $u_a < u_b$ if the number of the input 14 at which a arrives is less than the number of the input 14 at which b arrives. That is, the output-queued switch 16 is assumed to transfer cells from inputs 14 to outputs 20 in a round robin fashion starting with the smallest numbered input 14 first.

Now consider the combined-input-and-output-queued switch 34. By assumption, the same input is applied to it 34 and to the output-queued switch 16. Therefore, cell c arrives at input i at time T and is destined for output j. Since the speedup may now be less than N, c may not necessarily be forwarded to the buffer 18 at output j during time slot T. But, the crucial point is that c may not be required at output j for some time, because its clone in the output-queued switch 16 is some distance from the head-of-line. Therefore, the urgency is an indication of how much time there is before c is needed at its output 20 if the combined-input-and-output-queued switch 34 is not to fail in identically matching the behaviour of the output-queued switch 16. This motivates the following definition of urgency. The "urgency" of a cell 10 in a combined-input-and-output-queued switch 34 at any time is the distance its clone is from the head of the output buffer 18 in the corresponding reference output-queued switch 16.

One way of keeping track of urgency of a cell 10 is to "stamp" it on the cell when it arrives at the switch 34. That is, once the urgency of an incoming cell 10 is determined, a port processor at the respective input appends some extra bits to the cell 10. These bits carry the urgency number of the cell 10. With each time slot, the urgency numbers are decremented by one. Each cell is then transferred from its input 14 to its output 20 at a time determined by the scheduling method described below. When the cell 10 is ready to depart from the switch 34, the extra bits are stripped from the cell 10.

With the scheduling method, the following steps are performed for each phase:

1. At the beginning of each phase, the outputs 20 try to obtain their most urgent cells from the inputs 14.
2. If more than one output 20 requests a cell from a particular input 14, then that input 14 will grant to that output 20 whose cell 10 has the smallest urgency number.
3. If there is a tie between two or more outputs 20, then the output 20 with the smallest output number wins.
4. Outputs 20 that loose contention at an input 14 will try to obtain their next most urgent cell from another input 14.
5. When no more matching of inputs 14 and outputs 20 is possible, cells 10 are transferred by the switching fabric 24 and the scheduling method proceeds to step 1 of the next phase.

As mentioned above, the cells 10 need to be output from each output 20 in order of urgency. To do this, when a cell 10 is transferred to an output buffer 18, it may be placed in that buffer 18 in a position dependent on its urgency and with other cells in the buffer 18 being repositioned as necessary. Alternatively, the cell can may be placed in any empty location in the buffer 18, but the buffer 18 may be controlled so that it is always the most urgent cell 10 which is output from the buffer 18.

Figure 6:
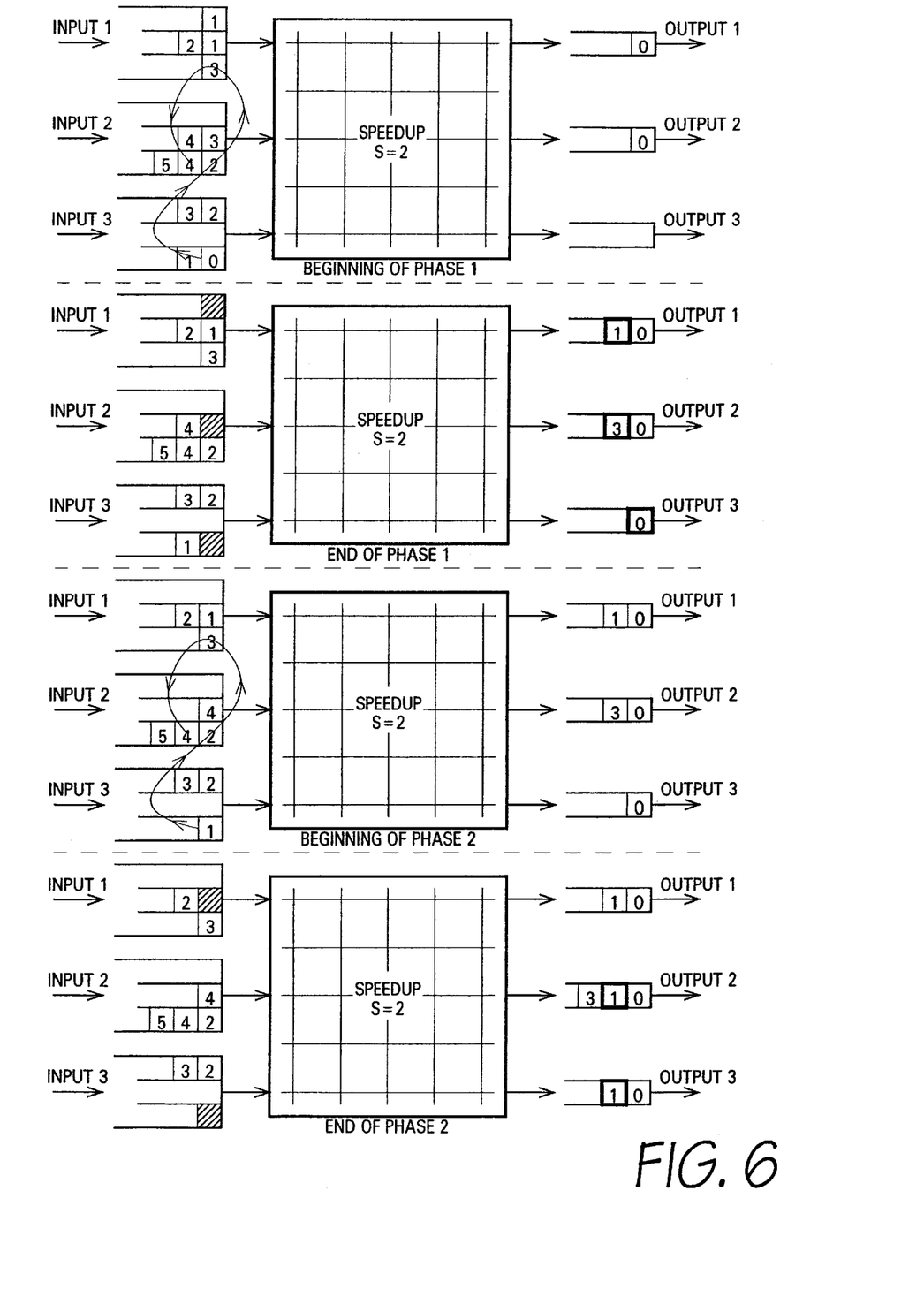
FIG. 6 is a schematic diagram illustrating the beginning and end of two phases of operation of the switch of the embodiment of the invention.

The operation of the scheduling method over one time slot is illustrated by means of an example in FIG. 6. Note that at the beginning of phase 1, both outputs '1' and '2' request input '1' to obtain their most urgent cells. Since there is a tie in the urgency of their requests, input '1' grants to output '1'. Output '2' proceeds to obtain its next most urgent cell which happens to be at input '2' and has an urgency of 3. Note also that during phase 2, the cell with urgency 1 is added to the queue in the buffer of output "2", not at the end of the queue, but instead between the cells with urgencies of 0 and 3.

In general, the following key observations can be made about the working of scheduling method. During any phase, a cell 10 will not be transferred from its input 14 to its output 20 for one of two (and only two) reasons:

Input contention: The output 20 is ready to receive the cell 10, but the input 14 wants to send a more urgent cell 10. (In the example of FIG. 6, output '2' cannot receive its most urgent cell in phase 1 because input '1' wants to send to output '1'.)

Output contention: The input 14 wants to send the cell 10, but the output 20 wants to receive a more urgent cell 10. (In phase 2 of the example of FIG. 6, input '2' cannot send its most urgent cell 10 because output '3' wants to receive from input '3'.)

The way in which scheduling method matches inputs and outputs is a variation of the "stable marriage problem", which was introduced by Gale and Shapley in 1962 (see Gale, D.; Shapley, L. S.; "College Admissions and the stability of marriage", American Mathematical Monthly, Vol. 69, pp 9–15, 1962). Solutions to the stable marriage problem find a "stable" and complete matching between inputs and outputs. A match is "unstable" if there is an input and output who are not matched to each other, yet both prefer the other to their partner in the current matching. A "stable" matching is any matching that is not unstable. There exists a well-known method (the Gale-Shapley method) that will always find a stable matching in N iterations.

The scheduling method can be implemented using the Gale-Shapley method with preference lists as follows. Output j first assigns a preference value to each input i, equal to the urgency of the cell at head-of-line of $VOQ_{ij}$. If $VOQ_{ij}$ is empty then the preference value of input i for output j is set to $+\infty$. The preference list of the output is the ordered set of its preference values for each input. Likewise, each input assigns a preference value for each output, and creates the preference list accordingly. A matching of inputs and outputs can then be obtained using the Gale-Shapley method.

There now follows a proof that a speedup of S=4 is sufficient to allow the embodiment of the invention to behave identically to an output-queued switch.

Theorem 1: An N×N combined-input-and-output-queued switch operating under the scheduling method can behave identically to an output-queued switch, regardless of input traffic patterns and for arbitrary values of N, so long as its speedup $S \geq 4$.

Theorem 2, which is a strengthening of Theorem 1 will be proved later. For now, some of the implications of Theorem 1 will be explored, assuming that it is true. This will allow certain conclusions to be made which help in the statement and proof of Theorem 2. In order to proceed, the concept of output threads and input threads will be introduced.

"Output Thread": At any time, the "output thread of a cell c" which is queued in $VOQ_{ij}$ is the ordered set of all cells c' which are queued in $VOQ_{i'j}$, $1 \leq i' \leq N$, and are more urgent than c. The "thread of output j" is the output thread of its least urgent cell.

For example, the output thread of the cell with urgency five in $VOQ_{23}$ at the beginning of phase 1 (see FIG. 6) has cells with urgencies {0,1,2,3,4}. The output thread of the same cell at the beginning of phase 2 has cells with urgencies {1,2,3,4}.

"Input Thread": The "input thread of a cell c" queued in $VOQ_{ij}$ is the ordered set of all cells c' which are in $VOQ_{ij'}$, $1 \leq j' \leq N$, and are more urgent than c. If cells p and q have the same urgency then p is placed before q in an input thread if p's output has a smaller number than q's output. The "thread of input i" is the input thread of its least urgent cell.

For example, the input thread of the cell with urgency three in $VOQ_{13}$ at the beginning of phase 1 (see FIG. 6) has cells with urgencies {1,1,2}. The input thread of the same cell at the beginning of phase 2 has cells with urgencies {1,2}.

With these definitions, one may draw some inferences about the scheduling method. (The following discussion is intended to motivate the statement and proof of Theorem 2 and is therefore presented in an informal manner.) Consider a combined-input-and-output-queued switch with speedup S operating under the scheduling method from time 1, having been empty before that time. It will fail to behave identically to an output-queued switch at time T if an input thread has S+1 or more cells with urgency 0. If this should happen, then clearly there are not enough phases to transfer all the most urgent cells to their outputs, and the scheduling method fails. Therefore if the scheduling method behaves identically at speedup S, it must be the case that every input thread has S or fewer cells with urgency 0 at the beginning of every time slot. Conversely, if there are always S or fewer cells with urgency 0 at each input, then the scheduling method never fails. Recording this as a lemma.

Lemma 1: A combined-input-and-output-queued switch with speedup S operating under the scheduling method behaves identically to an output-queued switch if, and only if, there are S or fewer cells with urgency 0 in each input at all times.

Since cells in an input thread are ordered according to urgency, this is the same as saying that a cell with urgency 0 cannot appear in the $(S+1)^{th}$ position in any input thread. Similarly, it is also clear that a cell with urgency 1 cannot appear in the $(2S+1)^{th}$ position at any time (assuming that every 0 occupies a position less than or equal to S), as this would lead to a failure of the scheduling method in the next cell time. In general, Lemma 1 is equivalent to the statement: A combined-input-and-output-queued switch with speedup S operating under the scheduling method behaves identically to an output-queued switch if, and only if, a cell with urgency l cannot occupy position (l+1)S+1 in an input thread at any time.

Suppose that the scheduling method behaves identically to an output-queued switch at all times when the speedup equals S. It is clear that it will also behave identically at every speedup S'>S. Indeed, more ought to be true: under identical inputs if a tagged cell c is forwarded to its output F phases after its arrival when the speedup is S, then it must be forwarded to its output within F'≦F phases when the speedup is S'. In particular, if c belongs to the thread of input i at time T when the speedup is S', then it also belongs to the thread of input i at time T when the speedup is S. This implies the following crucial point. If the scheduling method behaves identically to an output-queued switch at speedup S, then at any speedup S'≧S a cell with urgency l cannot appear at position S(l+1)+1 in an input thread.

It is believed, but has not yet proved, that the scheduling method behaves identically to an output-queued switch when S=2. If this were true, then the preceding observation would read: If the scheduling method behaves identically to an output-queued switch at speedup S=2, then at any speedup S'≧2 a cell with urgency e cannot appear at position 2(l+1)+1 in an input thread. In Theorem 2, the following stronger statement will be proved for S≧4: At the beginning of each time slot T, a cell with urgency l does not occupy position l+1 in an input thread; excluding any cell that might have just arrived. If this property were true of all input threads at all times then clearly the scheduling method never fails to behave identically to an output-queued switch, and Theorem 1 is verified.

Theorem 2, from which Theorem 1 follows as a corollary, will now be proved, having firstly developed the following lemma.

Lemma 2: Consider a tagged cell c which, at the beginning of time slot T, is in the input of a combined-input-andoutput-queued switch with speedup S. If c remains in its input at the end of time slot T and is not forwarded to its output, then a totality of S cells either from c's input thread or from its output thread must be delivered to their outputs during time slot T.

The proof of Lemma 2 is a consequence of input and output contention. That is, c is not forwarded to its output during a phase either because a cell in its input thread or a cell in its output thread has kept its input or, respectively, its output busy. And there are S such phases in each time slot.

Theorem 2: Consider an N×N combined-input-and-output-queued switch operating under the scheduling method with a speedup of S. Suppose that the switch has been operating from time slot 1, having been empty before that time. Let $S^i(t)$ be the thread at input i just at the beginning of time slot t, before any new cells have arrived. Then for each i and for each t, it is never the case that a cell with urgency 1 occupies position l+1 in $S^i(t)$ so long as $S \geq 4$.

In proof of Theorem 2, suppose T is the first time that such a thing happens at some input, say I. That is, $S^I(T)$ has a cell of urgency 1 occupying position l+1. Consider the thread $S_{l+1}^I(T) \subset S^I(T)$ consisting of the first l+1 cells of $S^I(T)$. Note that the least urgent cell of $S_{l+1}^I(T)$ has an urgency of 1.

(1) Let c be the cell belonging to $S_{l+1}^I(T)$ that arrived earliest, and let u be its urgency at time T. It follows that $u \leq 1$. It also follows that c arrived at least l+1 cell times ago.

(2) Suppose c actually arrived at time T–A. By (1) $A \geq l+1$, and the urgency of c upon arrival equals u+A precisely.

(3) By Lemma 2, every time slot that c is in the system on the input side, a totality of S cells belonging to the input and/or output threads of c must be sacrificed in order to prevent c from going to its output.

(4) Since c arrives at time T–A and remains in its input until time T–1, the number of "sacrifice cells" required during this time period equals the number of phases in [T–A, T–1] which equals S×A.

(5) By assumption of T being the first time at which things go wrong, the maximum number of cells in the input thread of c at time T–A is less than or equal to u+A. These are possible "sacrifice cells".

(6) By definition of urgency, the maximum number of cells in the output thread of c at time T–A is less than or equal to u+A. These are also possible "sacrifice cells".

(7) Putting (5) and (6) together, when c arrives, the maximum number of sacrifice cells in its input and output threads is no more than 2(u+A).

(8) Between T–A+1 and T–1, the maximum number of cells that can arrive at input I is less than or equal to A–1. Of these arrivals 1 will belong to $S_{l+1}^I(T)$ and hence cannot be "sacrifice cells". This implies that the maximum number of sacrifice cells that can arrive at input I after c is no more than A–1–1.

(9) A grand total on the maximum possible "sacrifice cells" is (putting (7) and (8) together):

$$2(u+A)+A-1-l=3A+u+(u-l)-1.$$

But, $$3A+u+(u-l)-1 \leq 3A+u \text{(since } u \leq 1\text{)} \leq 4A-1 \text{(since } u \leq 1 \leq A-1\text{)}.$$

(10) The number in (9) falls short of the requirement in (4) if $S \geq 4$. This contradiction proves the theorem.

In conclusion, with the continued demand for faster and faster switches, it is increasingly difficult to implement switches that use output queueing or centralized shared memory. Before long, it may become impractical to build the highest performance switches and routers using these techniques.

It has been argued for some time that most of the advantages of output-queuing can be achieved using combined input and output queueing. While this has been argued for very specific, benign traffic patterns there has always been a suspicion that the advantages would diminish in a more realistic operating environment.

The above description shows that a combined-input-and-output-queued switch can "behave identically" to an output-queued switch, or one using centralized shared memory. Perhaps more importantly, we show this is true for any sized switch, or for any traffic arrival pattern. The three sufficient conditions for this result to hold are: (i) virtual output queues are maintained at each input, (ii) at the end of each cell time, a novel scheduling method is used to configure the non-blocking switch fabric, and (iii) the switch fabric and memory run four times as fast as the external line rate; i.e. at a speedup of four.

It will be appreciated that many modifications and developments may be made to the embodiment of the invention, which has been described above purely by way of example, without departing from the spirit and scope of the present invention.

What we claim is:

1. A method of operation of a switching system, the switching system comprising:
   a plurality of output stages each operable to supply packets of data to a respective output line;
   a plurality of input stages each operable to receive packets of data on a respective input line, each received packet being destined for at least a respective one of the output stages; and
   a transfer stage operable to transfer packets of data from any of the input stages to those of the output stages for which those packets are destined; and
   the method of operation of the switching system comprising the steps of:
   for each output stage, noting the temporal order in which the packets destined for that output stage are received by the input stages; and
   controlling the transfer stage so that, for each output stage, the packets destined for the output stage are transferred from the input stages to that output stage in the noted order
   wherein each input stage comprises a plurality of input buffers, one for each output stage, the method further including the step of placing each received packet in that one of the input buffers for the input line on which that packet is received and for the output stage for which that packet is destined.

2. A method as claimed in claim 1, wherein:
   the system operates according to time slots such that:
   no more than one packet is received by each input stage during each time slot; and
   no more than one packet is supplied by each output stage during each time slot; and each time slot is divided into a plurality of phases such that:
   no more than one packet is transferred from each input stage by the transfer stage during each phase; and
   no more than one packet is transferred to each output stage by the transfer stage during each phase.

3. A method as claimed in claim 2, wherein each such time slot is divided into between two and four such phases.

4. A method as claimed in claim 2, wherein each such time slot is divided into four such phases.

5. A method as claimed in claim 2, wherein the controlling step includes the step, during each phase and for each output stage, of:

selecting that one of the input stages, if any, having that one of the packets which are destined for that output stage which is earliest in the noted temporal order; and transferring that one packet from the selected input stage to that output stage unless there is input contention due to the selected input stage also having been selected for another of the output stages.

6. A method as claimed in claim 5, wherein the controlling step includes the step, if there is such input contention, of selecting that one of the output stages whose destined packet is earliest in the noted temporal order, unless there is none which is earliest.

7. A method as claimed in claim 6, wherein the controlling step includes the step, in the case of input contention, of repeating the controlling step for the or each output stage which is not selected in respect of the next earliest packet in the noted temporal order.

8. A method as claimed in claim 6, wherein the output stages have a predetermined ranking, and wherein the controlling step includes the step, if none of the packets is earliest as aforesaid, of selecting between the output stages in accordance with the predetermined ranking.

9. A method as claimed in claim 8, wherein the controlling step includes the step, in the case of input contention, of repeating the controlling step for the or each output stage which is not selected in respect of the next earliest packet in the noted temporal order.

10. A method as claimed in claim 1, wherein each output stage comprises a respective output buffer for the packets, and the packets are output from the respective output buffer to the respective output line in dependence upon the noted temporal order of the packets in the respective output buffer.

11. A switching system comprising:

a plurality of output stages each operable to supply packets of data to a respective output line;

a plurality of input stages each operable to receive packets of data on a respective input line, each received packet being destined for at least a respective one of the output stages;

a transfer stage operable to transfer packets of data from any of the input stages to those of the output stages for which those packets are destined;

means for detecting, for each output stage, the temporal order in which the packets destined for the output stage are received by the input stages; and means for controlling the transfer stage so that, for each output stage, the packets destined for the output stage are transferred from the input stages to that output stage in the detected temporal order wherein each input stage comprises a plurality of input buffers, one for each output stage, the method further including the step of placing each received packet in that one of the input buffers for the input line on which that packet is received and for the output stage for which that packet is destined.

12. A system as claimed in claim 11, wherein each output stage comprises a respective output buffer for the packets, and the packets are supplied from that buffer to the respective output line in dependence upon the detected temporal order of the packets in the respective output buffer.

13. A system as claimed in claim 11, wherein each input stage comprises an input buffer for each output stage.

14. A system as claimed in claim 13, wherein the input buffers are first-in-first-out buffers.

* * * * *

UNITED STATES PATENT AND TRADEMARK OFFICE
CERTIFICATE OF CORRECTION

PATENT NO. : 6,351,466 B1
DATED : February 26, 2002
INVENTOR(S) : Balaji Prabhakar et al.

It is certified that error appears in the above-identified patent and that said Letters Patent is hereby corrected as shown below:

<u>Title page,</u>
Item [73], Assignee, change "Hewlett-Packard Company, Palo Alto, CA (US)" to
-- Hewlett-Packard Company, Palo Alto, CA (US); The Board of Trustees of the Leland Stanford Junior University, Palo Alto, CA (US) --.

Signed and Sealed this

Twenty-second Day of November, 2005

JON W. DUDAS
*Director of the United States Patent and Trademark Office*